US008939465B2

(12) United States Patent
Kastelic et al.

(10) Patent No.: US 8,939,465 B2
(45) Date of Patent: Jan. 27, 2015

(54) SAFETY RESTRAINT PROTECTION FOR AIRCRAFT OCCUPANTS SEATED FACING THE SIDE OF THE AIRCRAFT

(75) Inventors: Kurt Kastelic, Rochester, MI (US); John P. Wallner, Rochester Hills, MI (US); David Gunther, Sr., Rochester Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/232,919

(22) PCT Filed: Jul. 18, 2012

(86) PCT No.: PCT/US2012/047131
§ 371 (c)(1),
(2), (4) Date: Jan. 15, 2014

(87) PCT Pub. No.: WO2013/012890
PCT Pub. Date: Jan. 24, 2013

(65) Prior Publication Data
US 2014/0159356 A1    Jun. 12, 2014

Related U.S. Application Data

(60) Provisional application No. 61/508,726, filed on Jul. 18, 2011.

(51) Int. Cl.
*B60R 21/16*    (2006.01)
(52) U.S. Cl.
USPC ....................................... 280/730.2

(58) Field of Classification Search
CPC .... B64D 2201/00; B60R 21/20; B60R 21/21; B60R 21/23; B60R 21/206; B60R 21/207; B60R 22/00; B60R 22/023
USPC ............................ 280/730.1, 730.2
See application file for complete search history.

(56) References Cited

U.S. PATENT DOCUMENTS

| 4,655,312 | A | * | 4/1987 | Frantom et al. | 180/268 |
| 5,556,056 | A | | 9/1996 | Kalberer | |
| 8,528,932 | B2 | * | 9/2013 | Islam et al. | 280/730.2 |
| 8,556,291 | B2 | * | 10/2013 | Islam et al. | 280/730.2 |
| 2009/0178597 | A1 | * | 7/2009 | Sliwa, Jr. | 109/49.5 |
| 2014/0077478 | A1 | * | 3/2014 | Islam et al. | 280/728.2 |

FOREIGN PATENT DOCUMENTS

| DE | 29720219 U1 | 1/1998 | |
| DE | 29800607 U1 | 8/1998 | |
| EP | 1325836 A2 | 7/2003 | |
| JP | 11180398 A | 7/1999 | |
| JP | 2000306462 A * | 11/2000 | H01H 13/16 |
| SU | 457634 A * | 4/1975 | |

* cited by examiner

Primary Examiner — Faye M. Fleming
(74) Attorney, Agent, or Firm — Markell Seitzman

(57) ABSTRACT

A restraint system (120, 120a) for protecting at least one aircraft occupant, the aircraft including a cabin having at least one seat (54, 56, 58) facing a longitudinal center line of the aircraft, the restraint system including a first airbag (162) inflatable from a stored position to an inflated position, the airbag when inflated being adjacent the seated occupant and located on a side of the occupant facing the front of the aircraft, the airbag reducing occupant movement toward the front of the aircraft and cushioning the occupant from any impact, the system also includes a mechanism (222, 240) to lessen movement of the lower legs of the occupant.

11 Claims, 9 Drawing Sheets

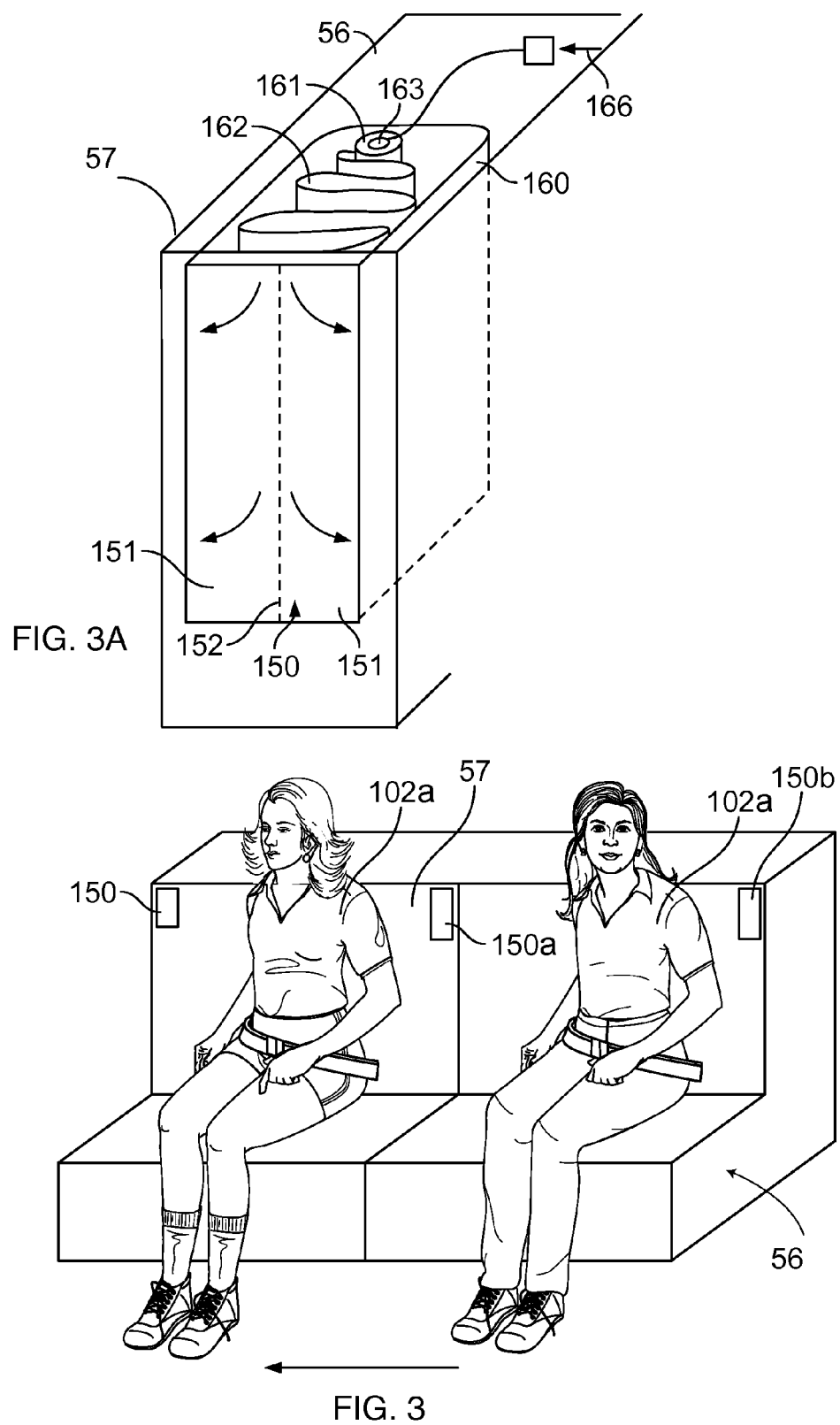

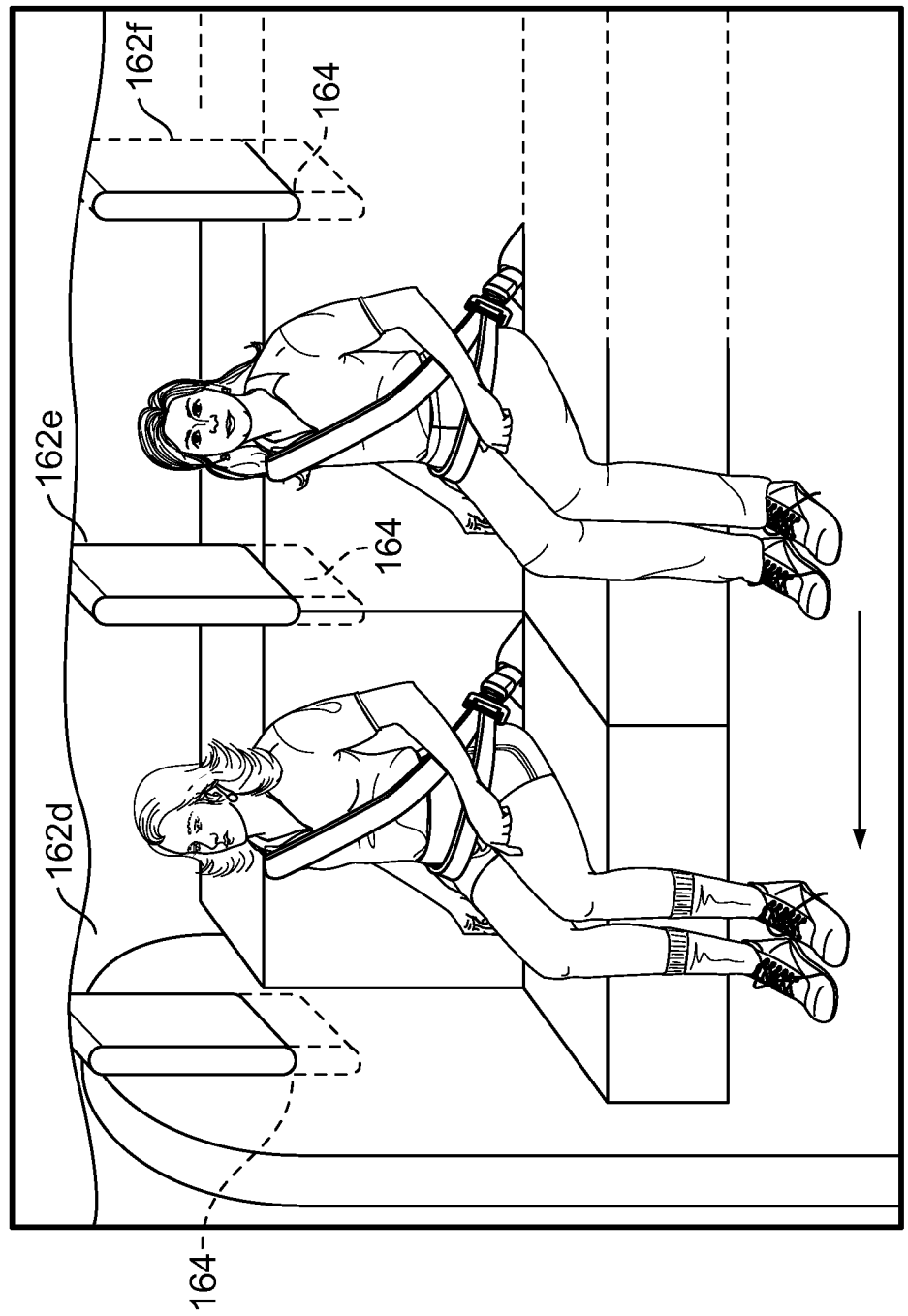

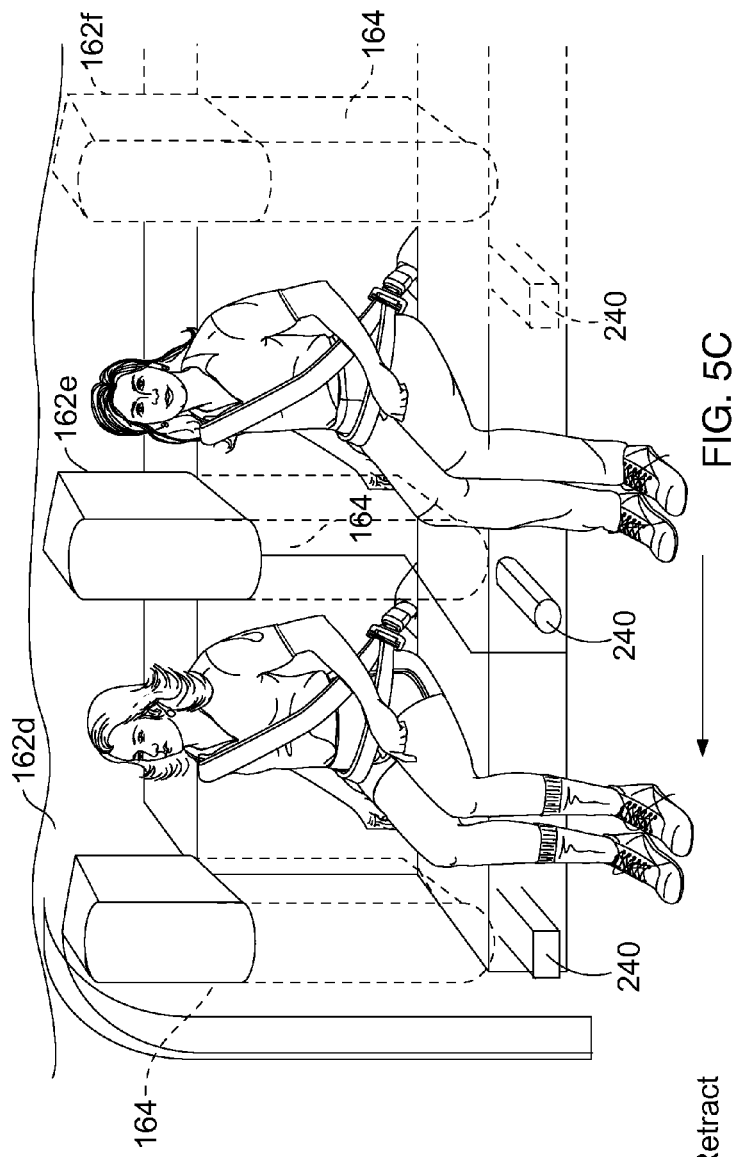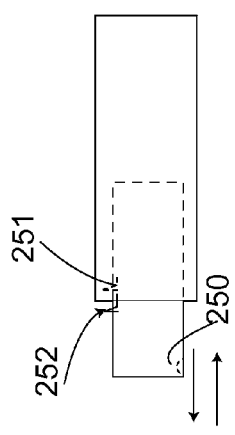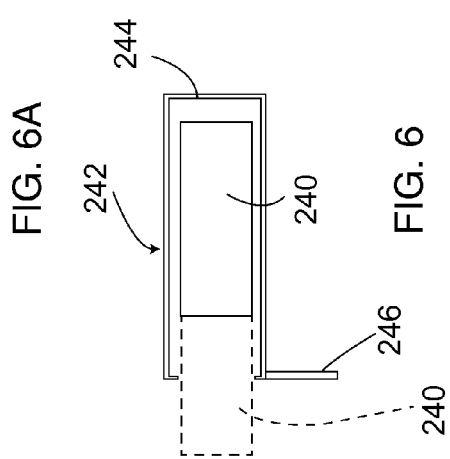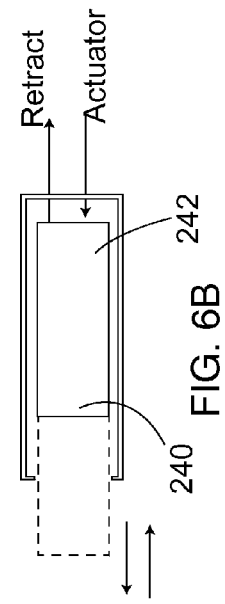

SAFETY RESTRAINT PROTECTION FOR AIRCRAFT OCCUPANTS SEATED FACING THE SIDE OF THE AIRCRAFT

The present invention claims priority to provisional U.S. application 61/508,726 filed Jul. 18, 2011. The present invention generally relates to occupant safety systems for aircraft and more particularly to restraint systems for occupants seated in seats that face toward the center of the aircraft.

BACKGROUND AND SUMMARY OF THE INVENTION

The present invention includes a restraint system for protecting at least one aircraft occupant, the aircraft including a cabin having at least one seat facing toward the center of the aircraft or seats generally facing in a direction generally perpendicular to the longitudinal center line of the aircraft; the restraint system includes a first airbag inflatable from a stored position to an inflated position, the airbag when inflated is located adjacent the seated occupant and located on a side of the occupant facing toward the front of the aircraft, the airbag reducing occupant movement toward the front of the aircraft and cushioning the occupant from an impact with adjacent aircraft structure, such as a wall or bulkhead and with another occupant who is adjacently seated.

BRIEF DESCRIPTION OF THE DRAWINGS

FIG. 3 shows a first embodiment of the present invention.

FIG. 3A shows the construction of the subassembly comprising an airbag housing, an inflator, an airbag and a deployable door or upholstered surface.

FIGS. 5, 5A, 5B and 5C show additional embodiments of the invention.

FIGS. 6, 6A and 6B show other embodiments of the invention.

DETAILED DESCRIPTION OF THE DRAWINGS

Figure 1:
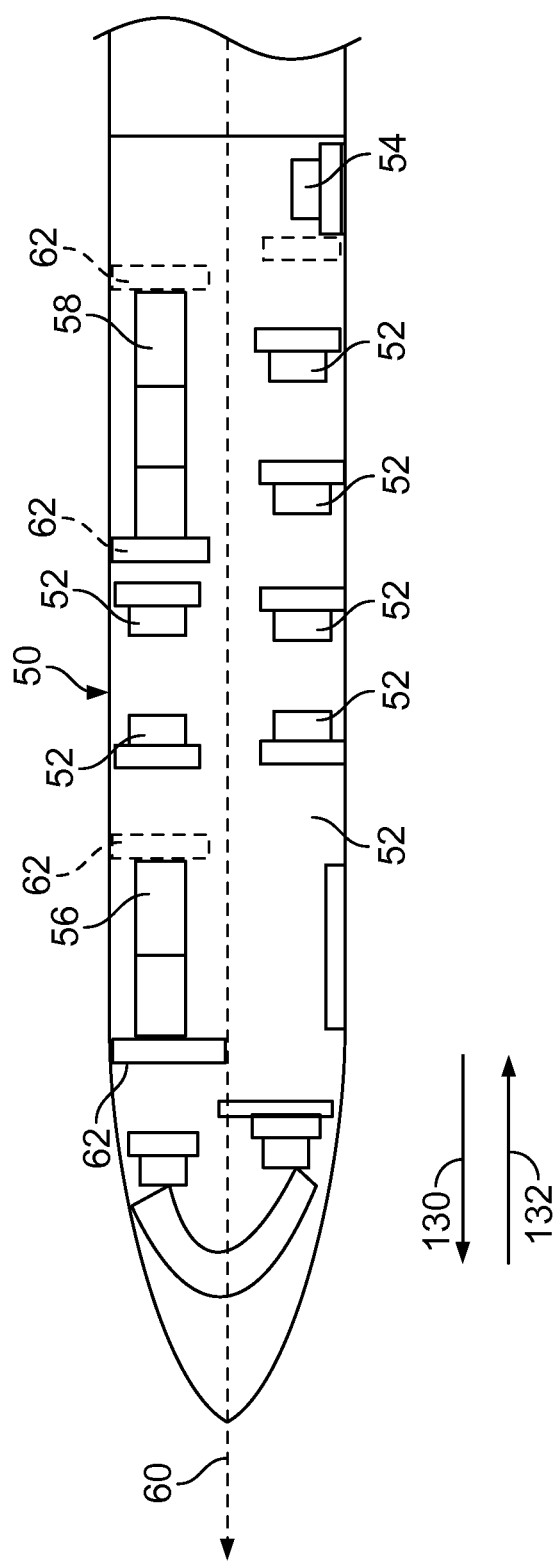
FIG. 1 illustrates a seating diagram for a typical general aviation aircraft including single, double and triple divan seats facing toward the center of the vehicle.

FIG. 1 shows a seating arrangement for a typical aircraft 50 such as a private jet. The seating arrangement includes a plurality of seats 52 arranged in the normal front-rear seating configuration. Aircraft 50 includes a plurality of center facing seats identified by numerals 54, 56 and 58, each of which respectively can seat for example: one, two or three passengers. The aircraft centerline or center axis is shown by numeral 60. The aircraft includes a number of bulkheads 62 and walls 64. As illustrated, the bulkheads may be on one or both sides of the center facing seats.

Figure 2:
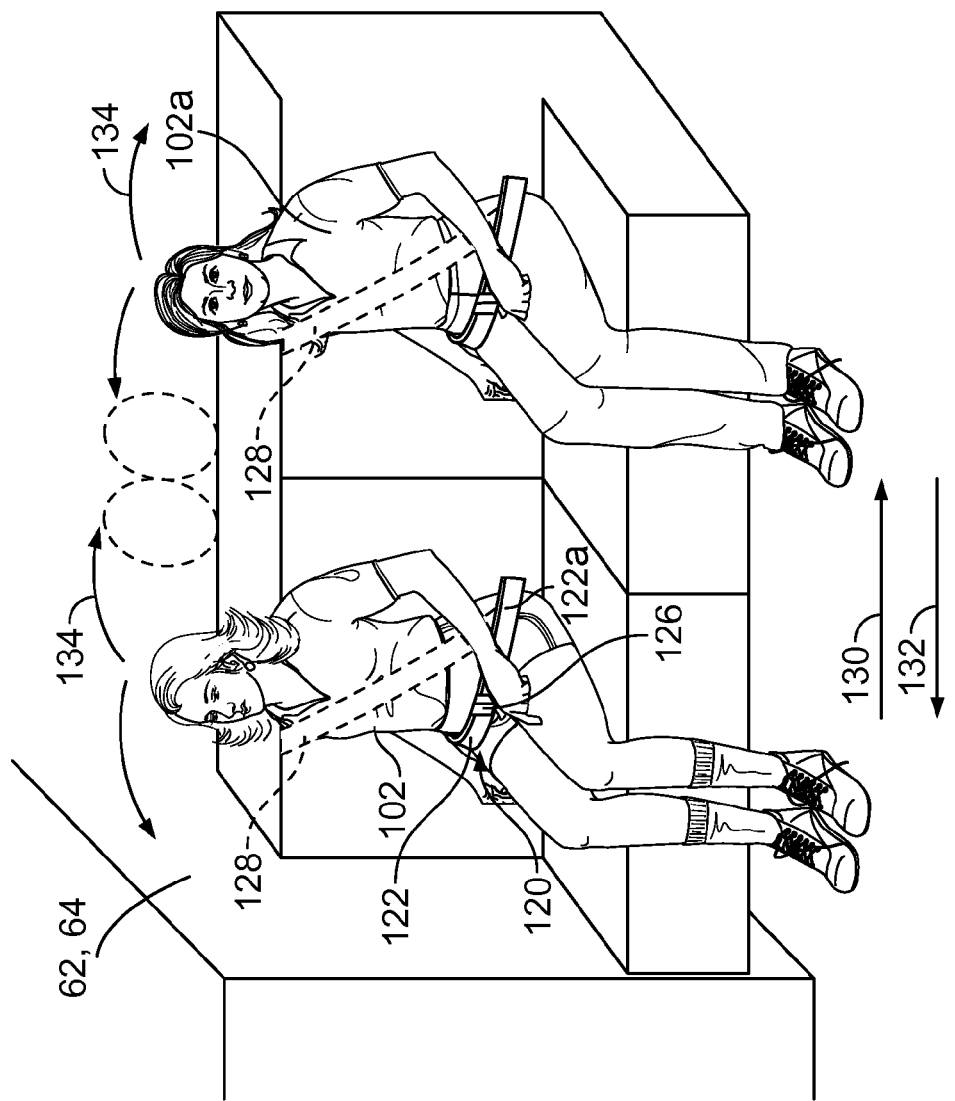
FIG. 2 shows an existing center-facing seat for multiple occupants.

Reference is briefly made to FIG. 2 which shows an existing center-facing aircraft seat 56 occupied by two occupants 102 and 102a. Each occupant is secured by a two-point safety belt system 120 used in aircraft for many years comprising two lengths of woven belt such as a seat belt 122 and 122a, one end of each is anchored to the seat or to the aircraft floor. At the other end of one belt 122 is a tongue 124 which is insertable and lockable within a buckle 126 located at the other end of belt 122a. Such tongues and buckles are known in the art. The deceleration vector of an aircraft landing or involved in a frontal accident is shown by arrow 130 and the acceleration vector of the aircraft taking off is shown by arrow 132.

In landing, accident or takeoff scenarios the occupant will initially move opposite to the direction of the appropriate vector, even if buckled up. The occupant pivots about his or her derriere and may slide upon the seat in the direction of the vector. Also, when the vehicle lands and if the aircraft's brakes are forcefully engaged, the occupant will initially move in the direction of arrow 130. In certain landings or takeoffs where the level of acceleration or deceleration is high the seated occupants may hit a bulkhead 62 or other structure such as a wall 64, see FIG. 1, appropriately positioned adjacent the occupant. The occupant 102a seated rearward of a first occupant 102 may collide with the body or head of the first occupant 102, injuring both. Low leg injury may also occur due to flailing motion of the legs or the legs contacting rigid surfaces or other occupants. After the initial collision with the bulkhead the occupant may rebound, see arrow 134, and collide with the adjacent occupant or another part of the aircraft. In view of the possibility of injury, aircraft occupants are discouraged from sitting in the divan seats during takeoff or landing. Practically speaking, by discouraging occupants from sitting in the center facing seats reduces the passenger carrying capacity of the aircraft. The above problems are solved by the present invention.

The injury potential of seating in the center facing seat is reduced with the use of a 3-point safety belt system. A shoulder belt is diagrammatically illustrated by numeral 128 to illustrate a 3-point safety belt system. The use of a 3-point system reduces sideways motion of the body in the direction of the shoulder over which the belt travels (as illustrated this would be in the direction of the front of the vehicle) but not in the opposite direction towards another seated occupant. Issues relating to this movement are also solved by the present invention.

Reference is made to FIG. 3 which illustrates two occupants seated on a center facing seat 56 such as a divan; FIG. 3 is much the same as FIG. 2. With reference to the seat back 57 of seat 56 there can be seen a plurality of frangible or deployable doors 150, 150a and 150b configured to be positioned near the shoulder of a typically sized seated occupant. FIG. 3A shows the detail of door 150 which is built into the upholstery of seat back 57; the door 150 has a tear line 152 running vertically which permits each half 151 of the door 150 to open upon inflation of an airbag. A door with a tear line can be replaced with one that pivots about a hinge or other similar solution. Situated within the seat back 57 is a housing 160, located in a cavity in the seat back, in which is placed an airbag inflator 161 and a deployable airbag 162. Inflators and airbags are also known in the art.

Figure 3B:
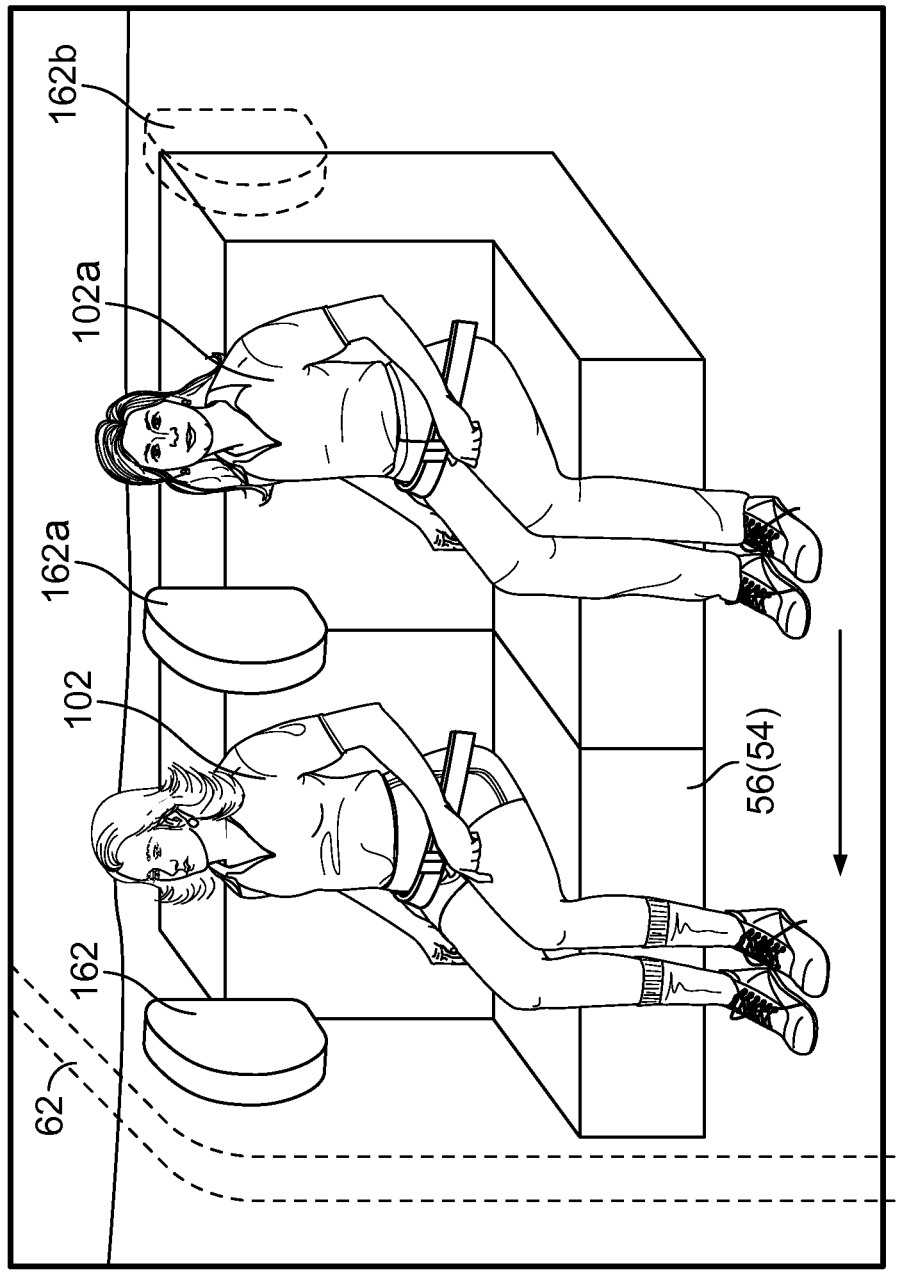
FIG. 3B shows further details of this first embodiment.

The airbag 162 can take on many different shapes. While not illustrated in detail, but it is common knowledge, the inflator 161 includes an igniter 163 which ignites upon receipt of a control signal from controller (computer, circuit, etc.) 166. Upon ignition of the igniter inflation gas is provided and/or supplied to airbag 162. As can be seen in FIG. 3A the airbag is initially stored in a compact configuration and upon receipt of inflation gas pushes against door 150 opening same to achieve a deployed condition such as illustrated in FIG. 3B. The stored configuration of the airbag can vary with folded, rolled or other similar configurations. With reference to FIG. 3B, airbag 162 is located between the first occupant 102 and a typical bulkhead or wall 62. Another airbag 162a is located between occupant 102 and occupant 102a at the location of door 150a. Depending upon the configuration of the aircraft it might be beneficial to include a third deployable airbag 162b (and inflator and door) on the other side of occupant 102a. Airbag 162 reduces the impact between the upper torso and head of occupant 102 with the bulkhead. Airbag 162a between the occupants minimizes any interaction between the two adjacent occupants. The airbag 162b on the other side of occupant 102a may be useful if occupant 102a moves toward the rear of the aircraft. The sizes of the airbags 160, 160a and 160b are shown for the purpose of illustration, the actual sizes may vary with application.

Figure 4:
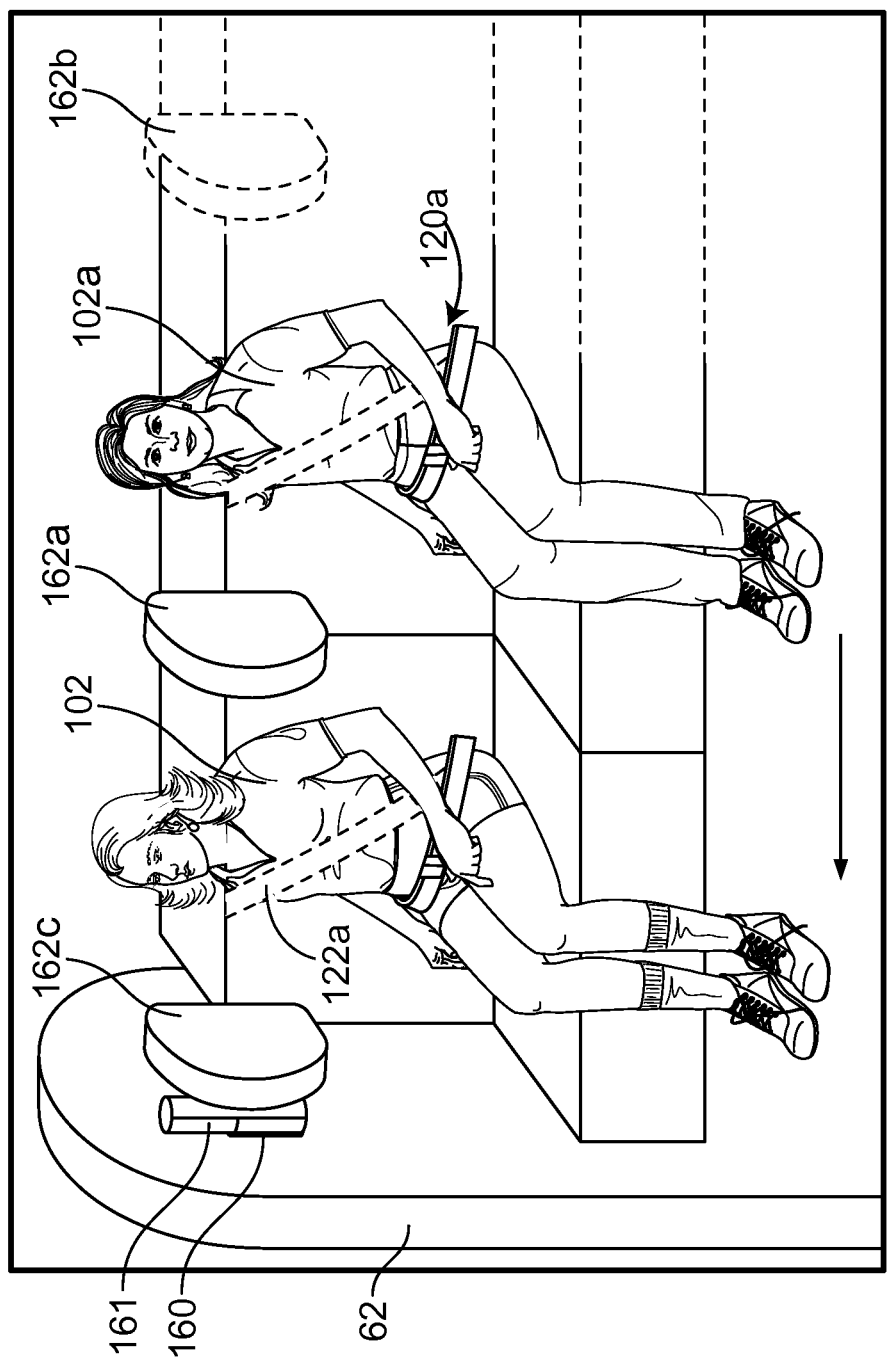
FIG. 4 shows another embodiment of the invention.

Reference is briefly made to FIG. 4 which illustrates two occupants 102 and 102a seated on a side facing seat such as 56 or 58. This embodiment is illustrative of a 3-point restraint system 120a using a lap belt as well as a shoulder belt 122a. As can be appreciated additional passengers will be seated on longer side facing seats; similarly only a single occupant would be seated on a narrow seat such as 54, see FIG. 1. The configuration of the airbags shown herein is applicable to each seating configuration 54, 56 and 58. In FIG. 4 a seat mounted airbag 162, its housing, the deployable door and inflator have been removed. In this embodiment the airbag housing 160 is fitted within a cavity in the adjacent bulkhead 62 and the deployable door 150 is mounted proximate the surface of bulkhead 62. Inflator 161 and airbag 162c are fitted initially within the housing 160 in the bulkhead. In this configuration airbag 162c deploys axially from the bulkhead toward occupant/passenger 102. Alternately, the airbag module can be surface mounted on the bulkhead.

Figure 5A:
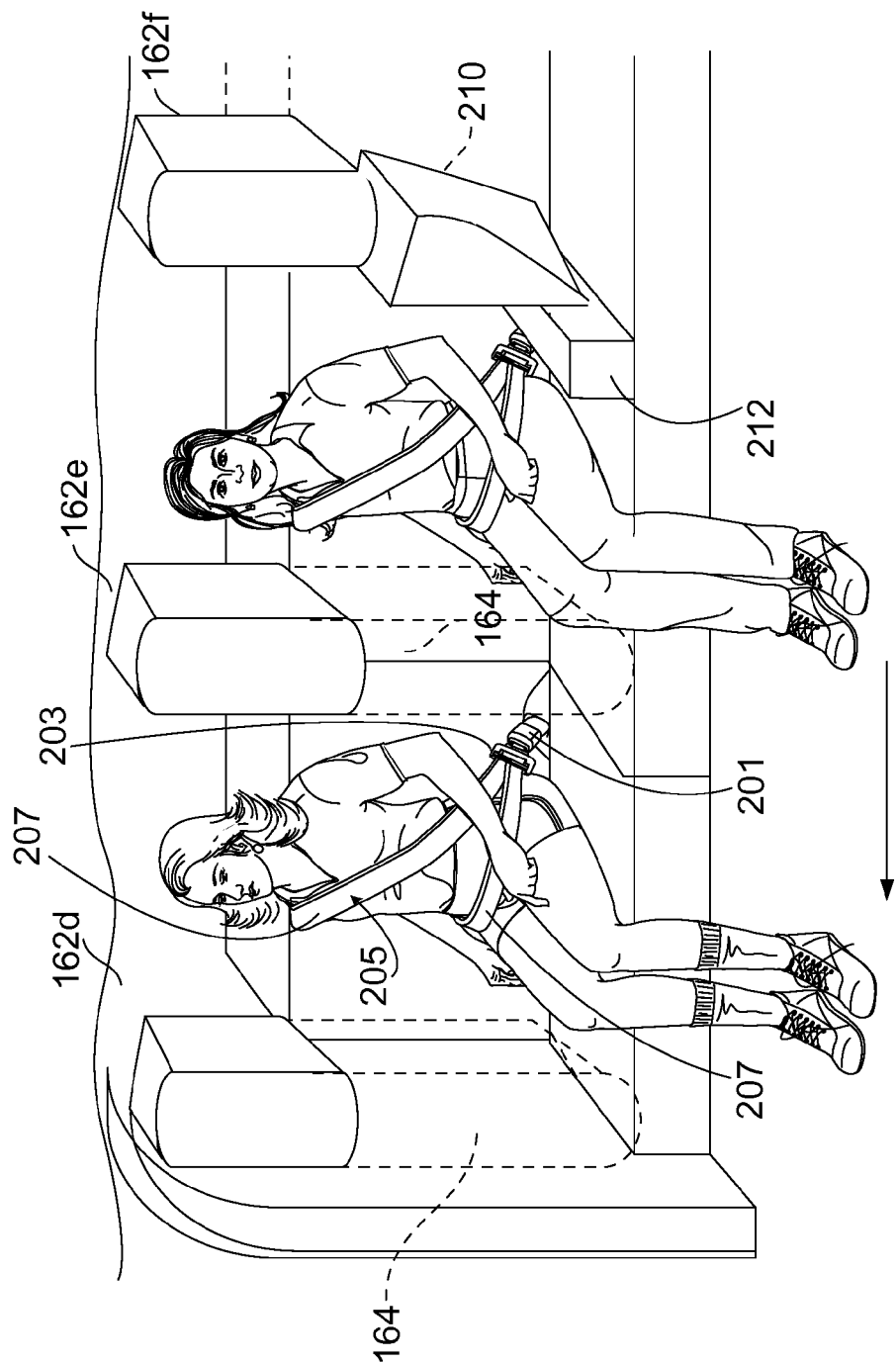

FIG. 5 shows an alternate embodiment of the present invention. In this embodiment the housing, inflator and airbag are positioned within the superstructure of the aircraft generally above the seated position of the passenger. In FIG. 5, a typical three-point seat belt restraint system is used comprising a buckle 201 and tongue 203 of known variety. In this configuration the seat belt 205 comprises a shoulder belt portion 207 and lap belt portion 209. The seat belt 205 passes through an opening in the tongue 203. If required a known type of seatbelt retractor can be associated with the shoulder belt and/or the lap belt. The buckle/tongue configuration shown is for the purpose of illustration; various combinations as known in the art can be used. In essence, each airbag 162d, 162e and 162f deploys from the roof 200 of the aircraft and is sized and positioned so that upon inflation it is adjacent the head and/or upper torso of the passenger. Each of the above airbags is diagrammatically shown with a phantom portion 164 to indicate that the length of the airbag can be provided to protect the head and/or torso of the passenger. Reference is briefly made to FIG. 5A which illustrates an alternate configuration of the airbags. As illustrated, airbags 162d-162f can extend from the occupant's head to his/her pelvic region or to the seat cushion. Based upon the various airbag configurations illustrated above, the various airbags 162-162f can be sized to protect the occupant's head, head and shoulder, head-shoulder-torso, and head to pelvic region or any combination thereof. FIG. 5A shows a further variation of the invention wherein the seat 54 (56) may include an armrest 210 with an airbag 212 deploying upwardly from the armrest 200. Additionally, this airbag 212 can be used independent of any other airbags and can be sized to extend from the pelvic region to the occupant's head region. Occupant protection can be achieved by utilizing a combination of an airbag deployable from or near the armrest in combination with another airbag deployable from the location near the occupant's head.

Figure 5B:
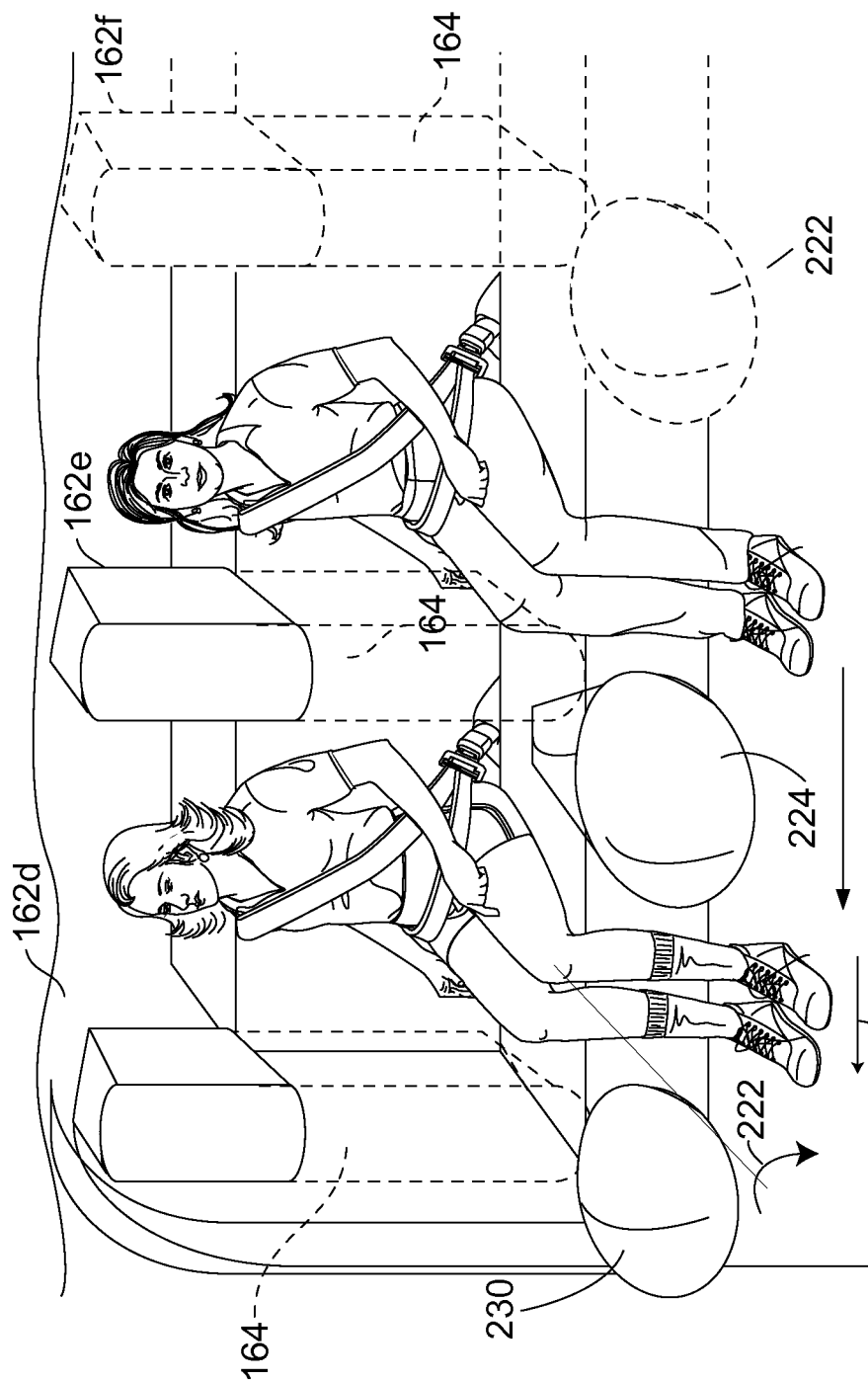

FIG. 5B shows a further embodiment of the invention. As previously described, during a frontal accident the occupants in the divan (sideward facing) seating position will tend to move toward the front of the vehicle, such movement of the occupant's head to pelvic region slowed by the various airbags described above. Additionally, as can be seen from the various figures, the lower legs of the occupant are not restrained, which is typical of this type of seating position. In many aircraft, the bulkhead does not extend to the floor in the area of the occupant's lower leg. The legs of the occupant seated near the bulkhead may also tend to move toward the front of the vehicle as illustrated by arrow 220, this movement may also tend to rotate the occupant's tibia as illustrated by arrow 221. This movement is prevented and/or significantly reduced with the utilization of a leg bag 230 which may be located in various positions of the seat. The leg bag 230, as well as any of the bags described above, would deploy from a housing, through a protective door and be inflated by an inflator. With regard to the leg bag 230, bag, housing, door, and inflator can be located at any convenient position such as for example in the vertical portion of the seat proximate the leg of the occupant. Air bag 222 is located so when it deploys it provides a barrier proximate the bottom of the bulkhead. FIG. 5B also shows a further embodiment where the airbag 224 is deployed from the region proximate the seat cushion. FIG. 5B shows the location of additional airbags 222 for large divans.

FIG. 5C shows a further embodiment of the leg protection mechanism. In this embodiment the forward movement of the leg and rotational movement of the tibia are protected by a piston 240 which is deployed from a stored position to an occupant protecting position during a frontal accident. As illustrated in FIG. 6, the piston 240 is part of the piston assembly 242 comprising a housing 244, the piston 240 and optional door. The deployment door 246 can be used to enclose an opening in the upholstery of the seat cushion and the door is moved aside by the deploying piston. The deployment door 246 is configured to move away from the occupant's legs. FIG. 6 does not illustrate a means for moving the piston outwardly. In FIG. 6A, a manually adjustable piston is shown. In this configuration the occupant or stewardess/steward would open the deployment door 246, if used, grab hold of the piston 240 for example by engaging a finger recess 250 and pull the piston to its locked deployed condition at which point the piston will be locked in place by a mechanism 251. The piston 240 may be restored back into the housing 244 by depressing a manual lock 252 which disengages mechanism 251. The arrows, unnumbered, which are part of FIG. 6A and which read Actuator and Retract show the forward and retracted motion of piston 240. In FIG. 6B, piston 240 may be moved out quickly upon actuation of various actuators such as an electrical solenoid, or gas producing inflator. The piston may be designed to become locked in its actuated position utilizing a lock mechanism such as 251 or alternatively the retraction movement of the piston can be controlled by a return spring. For example, the piston would be held in its actuated position as long as the solenoid was active, as long as there was sufficient gas pressure to hold the piston in place, thereafter the return spring moves the piston into the housing. In alternate embodiment, the piston and its housing can be located to the underside of the seat cushion.

Many changes in the described embodiments of the invention can, of course, be carried out without departing from the scope thereof. Accordingly, that scope is intended to be limited only by the scope of the appended claims.

The invention claimed is:

1. A restraint system (120, 120a) on an aircraft for protecting at least one aircraft occupant, the aircraft including a cabin having at least one center facing seat (54, 56, 58) facing a longitudinal center line of the aircraft, the restraint system including a first airbag (160, 162, 164) inflatable from a stored position to an inflated position, the airbag when deployed and inflated being adjacent a forward facing side of the center facing seat to protect the seated occupant, the deployed and inflated airbag being located on a side of the occupant closer to the front of the aircraft, the airbag reducing occupant movement toward the front of the aircraft and cushioning the occupant from any impact.

2. The systems according to claim 1 wherein the center facing seat (54, 56, 58) has seating for one or more occupants, and the restraint system includes additional first airbags (160, 162, 164) between each forward facing side of each center facing seat to protect each seated occupant.

3. The system according to claim 1 including a second airbag inflatable from a stored position to an inflated position, the airbag when deployed and inflated being adjacent a rearward facing side of the center facing seat to protect the seated occupant, the deployed and inflated second airbag being located on a side of the occupant closer to facing the rear of the aircraft, the second airbag reducing occupant movement toward the rear of the aircraft and cushioning the occupant from any impact.

4. The system according to claim 1 wherein each first airbag, in its stored position is stored in one of a bulkhead (62), a permanent aircraft structure, a roof of the aircraft or a side of a seat back or an armrest of the center facing seat and configured to deploy therefrom.

5. The system according to claim 1 wherein each second airbag, in its stored position is stored in one of a bulkhead (62), permanent aircraft structure (64), roof (200) of the aircraft or a side of a seat back or an armrest of the center facing seat and configured to deploy therefrom.

6. The system according to claim 1 including a controller sensitive to an activation signal to activate the first or second airbag or both during an emergency which requires activation of the airbags.

7. The system according to claim 1 including a weight sensor installed in the seat to detect the presence of a seated occupant, the system configured not to activate an airbag or airbags associated with an unoccupied seat.

8. The system according to claim 1 including a 2-point seat belt system securable about the occupant's lower torso.

9. The system according to claim 1 including a 3-point seat belt system securable about the occupant's torso.

10. The system according to claim 1 including a leg protection (222, 224, 242) mechanism configured to deploy to reduce induced motion of the lower leg or tibia of the occupant in the event of a crash or accident.

11. The systems according to claim 10 wherein the leg protection mechanism includes one of an inflatable airbag (222, 224) or movable piston (240).

* * * * *